United States Patent
Shapiro

(10) Patent No.: US 9,097,506 B2
(45) Date of Patent: Aug. 4, 2015

(54) THREE DIMENSIONAL RULER ASSEMBLY AND METHODS OF USE

(71) Applicant: Aspects of Wood, Inc., Sharon, MA (US)

(72) Inventor: Alan F. Shapiro, Sharon, MA (US)

(73) Assignee: Aspects of Wood, Inc.

( * ) Notice: Subject to any disclaimer, the term of this patent is extended or adjusted under 35 U.S.C. 154(b) by 150 days.

(21) Appl. No.: 13/680,109

(22) Filed: Nov. 19, 2012

(65) Prior Publication Data
US 2013/0125407 A1      May 23, 2013

Related U.S. Application Data

(60) Provisional application No. 61/561,854, filed on Nov. 19, 2011.

(51) Int. Cl.
| | |
|---|---|
| *B43L 7/00* | (2006.01) |
| *G01C 3/04* | (2006.01) |
| *G01C 3/10* | (2006.01) |
| *G01B 3/04* | (2006.01) |
| G01C 3/14 | (2006.01) |
| B25H 7/00 | (2006.01) |
| G01B 3/30 | (2006.01) |
| G01B 3/50 | (2006.01) |
| G01B 3/00 | (2006.01) |

(52) U.S. Cl.
CPC ........................................ *G01B 3/04* (2013.01)

(58) Field of Classification Search
CPC .............. G01B 3/04; G01B 3/30; G01B 3/26; G01B 3/28; G01B 3/46; G01B 5/02; G01B 5/14; G01B 3/50; G01B 7/14

USPC ........... 33/485, 487, 491, 494, 492, 562, 567, 33/501.45, 544.4

See application file for complete search history.

(56) References Cited

U.S. PATENT DOCUMENTS

| | | | |
|---|---|---|---|
| 2,536,401 A | 1/1951 | Victor | |
| 3,201,873 A | 8/1965 | Bell | |
| 4,584,774 A | 4/1986 | Link | |
| D308,831 S | 6/1990 | MacLean | |
| 6,941,605 B2 * | 9/2005 | McCreesh | 7/164 |
| 7,328,520 B2 | 2/2008 | Galle, Sr. | |

(Continued)

OTHER PUBLICATIONS

Muchmore Racing Luxury Aluminum Ride Height Gauge (Black), Sep. 30, 2009, Amain.com, p. 1.*
John Stranahan, Droop, Sep. 8, 2007, RCTech.net, p. 4.*

*Primary Examiner* — Laura Martin
*Assistant Examiner* — Rhyan C Lange
(74) *Attorney, Agent, or Firm* — John Brooks Law LLC; John J Brooks, III

(57) ABSTRACT

A ruler assembly comprising a ruler having a top extending along a ruler width and a ruler length. The top has an inner top surface and an outer top surface. The assembly has at least one side wall extending along the ruler length. The side wall extends from a side wall bottom edge to a side wall top edge proximal to the outer top surface. The outer top surface comprises a plurality of step surfaces, each having a step height measured from the side wall bottom edge to the side wall top edge of each of the plurality of step surfaces. In some embodiments, the inner top surface and the inner side wall surface define a ruler cavity configured to removably couple to an insert ruler.

18 Claims, 17 Drawing Sheets

(56) References Cited

U.S. PATENT DOCUMENTS

| | | |
|---|---|---|
| 7,467,471 B1 | 12/2008 | Sutter |
| D596,054 S | 7/2009 | Nieto |
| 2010/0089151 A1* | 4/2010 | Mantilla et al. ............ 73/426 |

* cited by examiner

THREE DIMENSIONAL RULER ASSEMBLY AND METHODS OF USE

CROSS-REFERENCE TO RELATED APPLICATIONS

This application claims the benefit of U.S. App. No. 61/561,854, filed on Nov. 19, 2011, entitled "3D RULER GAP GAUGE", the entire contents of which are incorporated herein by reference.

BACKGROUND OF THE INVENTION

1. Field of the Invention

This invention relates to a ruler assembly, in particular it relates to a ruler with three distinct planes of precise reference surfaces, and its methods of use.

2. Description of the Prior Art

In the field of measuring devices, it is known that rulers and tape measures typically provide measurements along two dimensions, or a single plane, such as length or width, at any given time. Typically, a ruler provides a single plane for measuring, such as a straight edge, along with measurement markings. A tape measure generally provides measurements in greater lengths than a ruler, but usually does not provide a good straight edge.

Ruler assemblies with multiple dimensions are also known such as those disclosed in U.S. Pat. No. 2,536,401 filed Sep. 14, 1944 to Victor Victor, U.S. Pat. Ser. No. D596,054 filed Mar. 13, 2008 to German Nieto and U.S. Pat. No. 3,201,873 filed May 29, 1963 to J.C. Bell et al., each of which are incorporated herein in their entirety. However, ruler assemblies with multiple dimensions do not disclose all of the features described by the ruler assembly embodiments disclosed herein.

SUMMARY OF THE INVENTION

The following summary is included only to introduce some concepts discussed in the Detailed Description below. This summary is not comprehensive and is not intended to delineate the scope of protectable subject matter, which is set forth by the claims presented.

One example embodiments of the ruler assembly provides a three dimensional ruler assembly that provides three distinct planes of reference surfaces allowing a user to precisely measure distances utilizing any of these planes. In some embodiments, the configuration of the surfaces in the different planes provides multiple step surfaces that allow for precise measurements at multiple intervals.

In one example embodiment, a ruler assembly is provided comprising a ruler having a top extending along a ruler width and a ruler length, the top having an inner top surface and an outer top surface, at least one side wall extending along the ruler length, the at least one side wall having an inner side wall surface and an outer side wall surface, the outer side wall surface extending along the ruler length and generally perpendicular to the outer top surface, the inner top surface and the inner side wall surface defining a ruler cavity, the at least one side wall extending from a side wall bottom edge to a side wall top edge proximal to the outer top surface and the outer top surface comprising a plurality of step surfaces each having a step height measured from the side wall bottom edge to the side wall top edge of each of the plurality of step surfaces. In some embodiments, the ruler assembly further comprises a plurality of side measurement elements on the outer side wall surface a plurality of top measurement elements on the outer top surface, the plurality of top measurement elements corresponding to the step height at each of the step surfaces and the plurality of side measurement elements corresponding to a distance along the ruler length from an end of the ruler assembly. In some embodiments, the ruler assembly is comprised of a nonconductive material. In some embodiments, each of the plurality of step surfaces has a step height having a height offset from an adjacent step height of an adjacent step surface and in some embodiments, the height offset is ⅛th of an inch.

In some embodiments, the ruler assembly further comprises an insert ruler comprising an insert top extending along an insert ruler width and an insert ruler length, the insert top having an insert inner top surface and an insert outer top surface, at least one insert side wall extending along the insert ruler length, the at least one insert side wall having an insert inner side wall surface and an insert outer side wall surface, the insert outer side wall surface extending along the insert ruler length and generally perpendicular to the insert outer top surface, the insert inner top surface and the insert inner side wall surface defining an insert ruler cavity, the at least one insert side wall extending from an insert side wall bottom edge to an insert side wall top edge proximal to the insert outer top surface, the insert outer top surface comprising a plurality of insert step surfaces each having an insert step height measured from the insert side wall bottom edge to the insert side wall top edge of each of the plurality of insert step surfaces and the insert ruler width, the insert ruler length and the insert ruler height dimensioned whereby the insert ruler nests in the ruler cavity. In some embodiments, the ruler assembly further comprises means for removably coupling the ruler assembly to the insert ruler. In some embodiments, the means for removably coupling the ruler assembly to the insert ruler assembly comprises a magnetic element coupled to the cavity of the ruler assembly and a mating insert magnetic element coupled to the insert ruler. In some embodiments, each of the plurality of insert step surfaces has an insert step height having an insert height offset from an adjacent insert step height of an adjacent insert step surface. In some embodiments, the insert height offset is one half of the height offset and in some embodiment, the insert height offset is $\frac{1}{16}$th of an inch. In some embodiments, a length of each of the plurality of insert step surface is one half of a length of each of the plurality of step surfaces whereby when the insert outer top surface is placed on the outer top surface of the ruler, the insert outer top surface interlocks with the outer top surface.

In some embodiments, a ruler assembly is provided comprising an insert ruler having an insert top extending along an insert ruler width and an insert ruler length, the insert top having an insert inner top surface and an insert outer top surface, at least one insert side wall extending along the insert ruler length, the at least one insert side wall having an insert inner side wall surface and an insert outer side wall surface, the insert outer side wall surface extending along the insert ruler length and generally perpendicular to the insert outer top surface, the insert inner top surface and the insert inner side wall surface defining an insert ruler cavity, the at least one insert side wall extending from an insert side wall bottom edge to an insert side wall top edge proximal to the insert outer top surface, the insert outer top surface comprising a plurality of insert step surfaces each having an insert step height measured from the insert side wall bottom edge to the insert side wall top edge of each of the plurality of insert step surfaces and the insert ruler width, the insert ruler length and the insert ruler height dimensioned whereby the insert ruler nests in the ruler cavity. In some embodiments, the ruler assembly further comprises a plurality of insert side measurement elements on the insert outer side wall surface, a plurality of insert top measurement elements on the insert outer top surface, the plurality of insert top measurement elements corresponding to the insert step height at each of the insert step surfaces and the plurality of insert side measurement elements corresponding to an insert distance along the insert ruler length from an insert end of the insert ruler assembly. In some embodiments, the insert ruler is comprised of a nonconductive material. In some embodiments, the insert ruler further comprises at least one insert front wall and a writing utensil sharpener removably coupled to the at least one insert front wall inside the insert ruler cavity.

In one embodiment, a method of determining a measurement between a first surface and a second surface using a ruler assembly is provided, the method comprising providing a ruler assembly comprising positioning the ruler assembly between the first surface and the second surface whereby the outer top surface is proximal to the first surface and the side wall bottom edge is proximal to the second surface, aligning the side wall bottom edge with the second surface, aligning one of the plurality of step surfaces with the first surface and determining the measurement between the first surface and the second surface as the step height corresponding to the step surface aligning with the first surface.

BRIEF DESCRIPTION OF THE SEVERAL VIEWS OF THE DRAWINGS

A more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

A ruler assembly will now be described in detail with reference to the accompanying drawings. It will be appreciated that, while the following description focuses on a ruler assembly that provides measurements typical of tasks performed by carpenters, the systems and methods disclosed herein have wide applicability. For example, the ruler assembly may aid those who are sight impaired make measurements and the ruler assembly may be used in applications such as arts and crafts or setting up manufacturing machinery.

In general, embodiments disclosed herein address several uniquely recognized disadvantages with the various types of prior rulers and tape measures. For example, the physical structure of a ruler or tape measure typically makes it difficult to easily measure certain types of dimensions. Embodiments disclosed herein provide a ruler assembly, i.e., a three dimensional ruler with three dimensions of calibrated reference surfaces, that allows for easy and accurate measurements using multiple features of the ruler assembly that are provided by multiple dimensions of the ruler assembly. For example, gaps between surfaces may be difficult to measure precisely due to the difficulty in getting a ruler aligned with the gap, and the usual method of measurement utilizes optical discernment (eyesight), which is limited to the quality of the user's vision. Embodiments disclosed herein provide a ruler assembly and methods that allow the ruler assembly to fit between the surfaces to easily measure the gap, utilizing tactile feedback to determine precise size. As another example, determining small gradations between two measurements can be easier and more accurate if performed tactilely. Embodiments disclosed herein provide a ruler assembly that allows that comparison to be performed both visually and tactilely. Additionally, a tape measure typically has crimping hook loosely riveted to the end of the tape measure. The crimping hook can be helpful to catch onto an edge when measuring. The crimping hook, however, can also get in the way during the process of taking the measurements, making it difficult to accurately gauge the smallest measurements, such as 1 inch or less, especially at the beginning of the tape measure, where the metal crimping is located. Embodiments disclosed herein provide a ruler assembly that allows accurate measurements even at very small increments, such as $1/16^{th}$ of an inch. Therefore, the inventor recognizes a need exists for a multidimensional ruler assembly that provides length measurements along a straight edge as well as height measurements provided by a series of step surfaces along the top of the ruler assembly.

Figure 1:
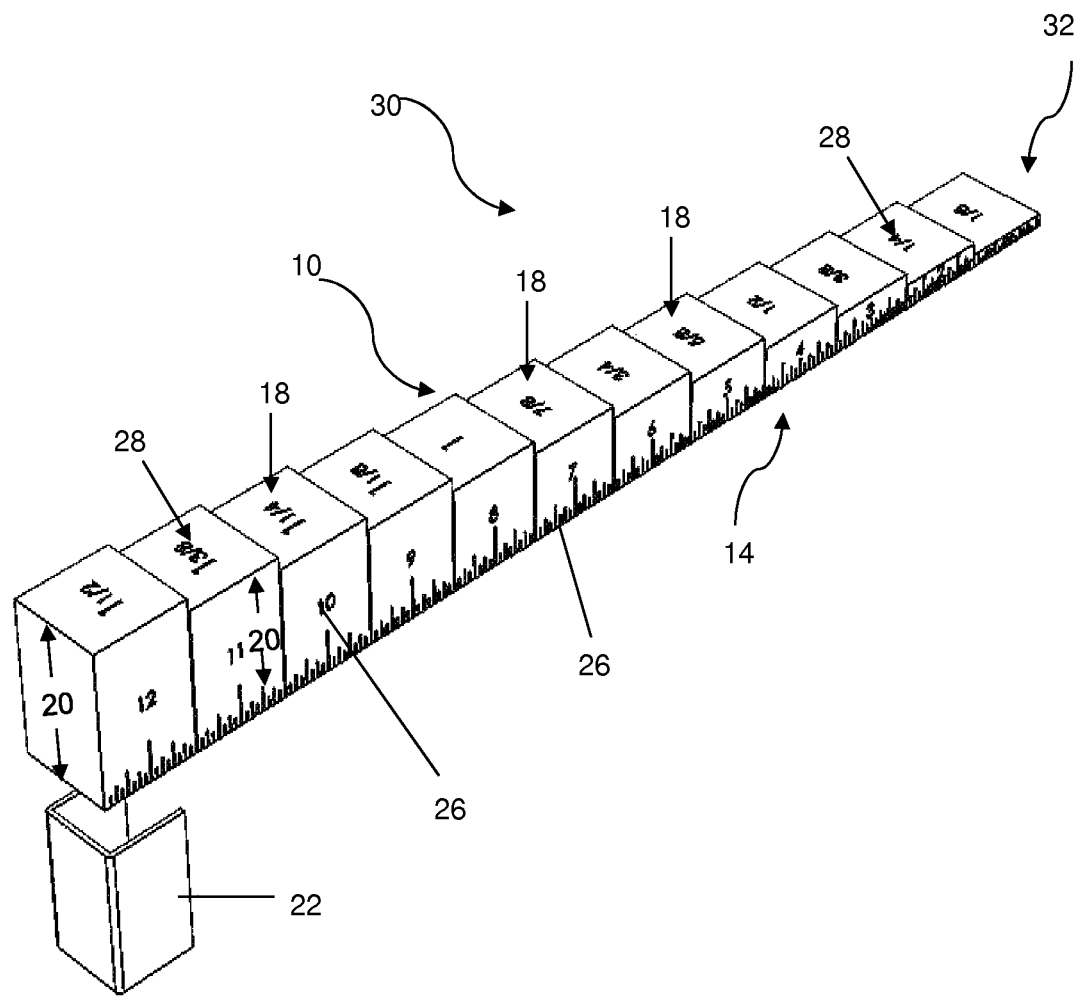
FIG. 1 illustrates an exploded perspective view of one embodiment of the ruler.

One Example Embodiment of the Ruler Assembly:

For illustration purposes and not for limitation, one embodiment disclosed herein is shown in FIG. 1. It is understood that although the illustrations below and in the drawings utilize measurements described in U.S. units, any of the distances or measurement units discussed herein may also be metric units. It is also understood, that as claimed and described below, the ruler assembly may comprise a ruler, an insert ruler or the ruler and insert ruler together.

FIG. 1 shows an exploded perspective view of one embodiment of the ruler assembly comprising a ruler 30. The ruler 30 comprises a top extending along a ruler width and a ruler length. The top has an inner top surface and an outer top surface 10. The ruler 30 has at least one side wall extending along the ruler length. The side wall has an inner side wall surface and an outer side wall surface 14. The outer side wall surface 14 extends along the ruler length and generally perpendicular to the outer top surface 10. The inner top surface and the inner side wall surface define a ruler cavity (see FIG. 7). The side wall extends from a side wall bottom edge to a side wall top edge proximal to the outer top surface 10. The outer top surface 10 comprises a plurality of step surfaces 18 each having a step height 20. The step height 20 is measured from the side wall bottom edge to the side wall top edge of each of the plurality of step surfaces 18. In an example embodiment, the ruler 30 comprises a back wall 32 extending along the ruler width, where the back wall 32 is proximal to the outer top surface 10 and the at least one side wall. In an example embodiment, the ruler 30 comprises a plurality of side measurement elements 26 on the outer side wall surface 14, and a plurality of top measurement elements 28 on the outer top surface 10. The plurality of top measurement elements 28 corresponds to the step height 20 at each of the step surfaces 18. The plurality of side measurement elements 26 corresponds to a distance along the ruler length from an end of the ruler 30. In an example embodiment, the side measurement elements 26 and/or the top measurement elements 26 may be, but are not limited to, printed, embossed, and/or debossed elements. The ruler 30 may also comprise a means to removably couple the ruler 30 and an insert ruler 84 (see FIG. 8). In the embodiment shown, the means to removably couple the ruler to the insert ruler comprises a magnetic element 22 coupled to a ruler cavity (see FIG. 7). The magnetic element 22 mates with a magnet on the insert ruler 84. In an example embodiment, the top and the side wall comprises a single unitary structure. In one example embodiment, the ruler 30 comprises the top and two side walls. In an example embodiment, each of the plurality of step surfaces 18 has a step height 20. Each step height 20 has a height offset from an adjacent step height 20 of an adjacent step surface 18. The step height can be any step height that results in placement of step surfaces at heights useful to the user. In an example embodiment, the height offset is $1/8^{th}$ of an inch. As shown, a step surface 18 is a portion of the outer top surface 10 with a width and a length that has a generally flat surface generally extending perpendicular to the side wall. Each of the step surfaces may be a surface at a constant step height 20 extending along its width and length and each of the step surfaces may have the same length and width.

As used throughout this description, a measurement element is any type of element, such as a printed marking, protrusion, recess, indent, etc., that identifies one location in relationship to another location. For example, referring again to FIG. 1, a measurement element 26 may be a protrusion of a different color on the outer side wall surface 14 marking how far one point is from the back wall 32 of the ruler 30. In some embodiments, the measurement elements are embossed, and/or debossed. The measurement elements may identify any units of measure helpful to the user. As shown for illustration only in FIG. 1, the side measurement elements 26 are divided in increments such as at $1/16^{th}$ of an inch increments, with larger increments, such as at each inch, labeled with numbers.

The ruler 30 may be made from any suitable material such as wood, metal, aluminum, carbon fiber, titanium, plastic, resins and any combination thereof. In one example embodiment, the ruler 30 is manufactured out of a nonconductive material. This is beneficial when performing electrical work since a conductive material might create an electrical short or electrocute a user. Examples of nonconductive materials include, but are not limited to, wood, plastic, resins etc. The ruler 30 may be made from a material that maintains rigidity and retains accuracy within a temperature range typically encountered by workers in trades such as plumbing, carpentry or electricians, such as a range of −20° to +120° F. The highest accuracy of measurement using the ruler 30 is achieved in a more moderate range of these limits such as between 40° and 100° F.

Figure 2:
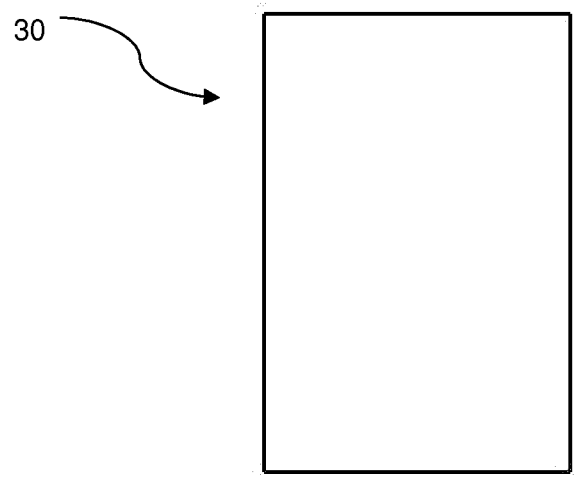
FIG. 2 illustrates an exploded front view of one embodiment of the ruler
Figure 2:
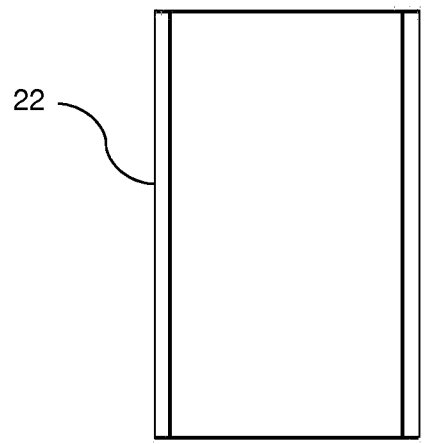

FIG. 2 shows an exploded front view of one embodiment of the ruler 30 and the magnetic element 22. The magnetic element 22 is dimensioned to couple to a ruler cavity (see FIG. 7). The magnetic element 22 may be coupled to the ruler cavity 16 by any means to couple such as adhesives, mating connectors, friction or connectors such as rivets or screws. In one example embodiment, the magnetic element 22 is coupled to ruler cavity (see FIG. 7) by an adhesive securing the outer surface of the magnetic element 22 to the interior surface of the ruler cavity (see FIG. 7).

Figure 3:
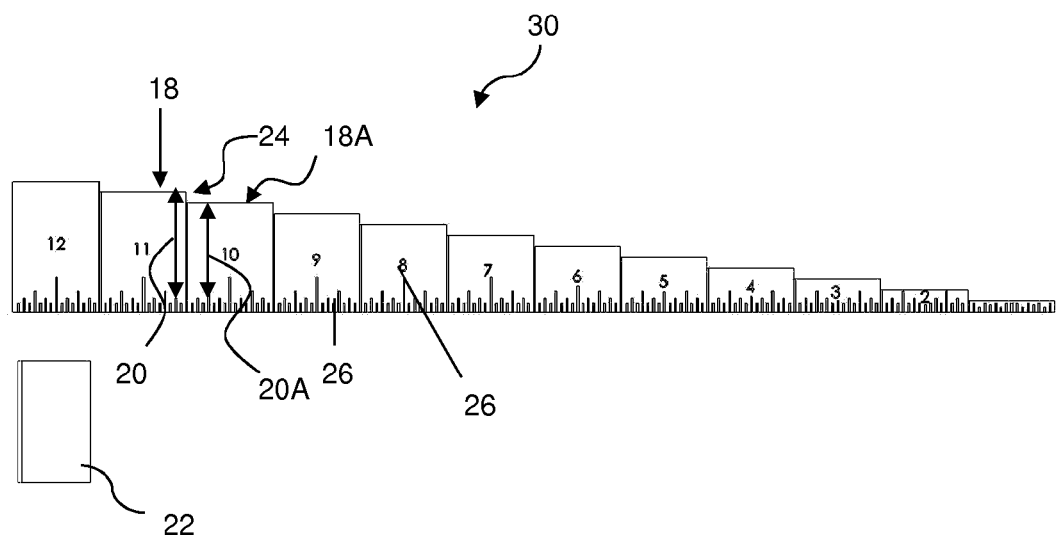
FIG. 3 illustrates an exploded left view of one embodiment of the ruler.

FIG. 3 shows an exploded left view of one embodiment of the ruler 30, and a magnetic element 22. The top has a plurality of step surfaces 18, each having a step height 20. Each step surface has a height offset 24 from an adjacent step surface 18. Illustrated here, step surface 18 has a height offset 24 from an adjacent step height 20A of an adjacent step surface 18A. The plurality of side measurement elements 26 corresponds to a distance along the ruler length from an end of the ruler 30. As shown, the side measurement elements 26 are markings along the outer side wall surface 14 and correspond to the distance of those side measurement elements 26 from the back wall 32. As shown, a height offset 24 is a height difference between the step height 20 of one step surface 18 and the step height 20A of an adjacent step surface 18A. In some embodiments, the height offset 24 creates a height offset wall connecting the step surface 18 and the adjacent step surface 18A. The length, width and height of the ruler may be any length and in any proportion to each other that make the ruler convenient for the user. This flexibility in dimension also applies to other dimensions such as the step heights and the height offsets. In one example embodiment, the length and width of the ruler are proportioned such that the insert ruler can nest inside the ruler cavity. In an example embodiment, for illustration purposes and not for limitation, the ruler 30 has a ruler length of 12 inches, and 1 inch wide. The side measurement elements 26 are divided in $1/16^{th}$ of an inch increments, with each inch labeled with numbers. The step heights 20 range from a minimum of $1/8^{th}$ of an inch to a maximum of $1 1/2$ inches, with each height offset equaling $1/8^{th}$ of an inch.

Figure 4:
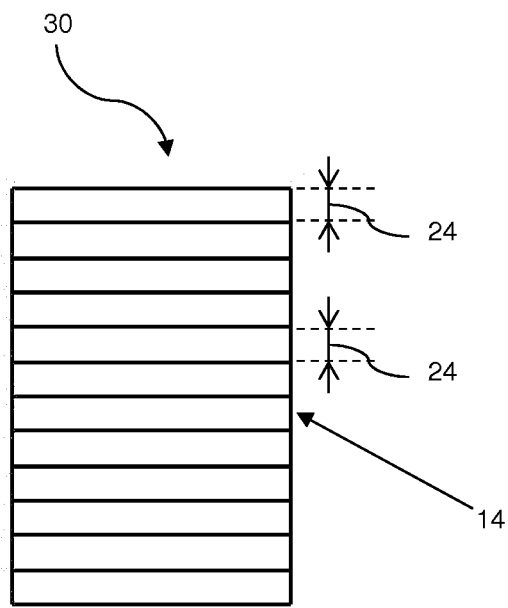
FIG. 4 illustrates an exploded back view of one embodiment of the ruler.
Figure 4:
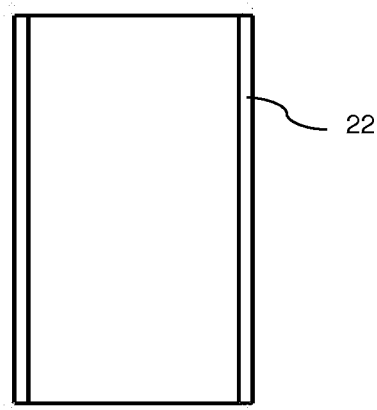

FIG. 4 shows an exploded back view of one embodiment of the ruler 30 and the magnetic element 22. The magnetic element 22 couples to a ruler cavity (see FIG. 7). The ruler 30 has an outer side wall surface 14. Also shown is the height offset 24 for adjacent step surfaces (not shown). As shown, the magnetic element 22 may be three sided, and U-shaped, dimensioned to fit tightly inside the large end of the ruler 30. The magnetic element 22 nests inside the ruler 30 with a bottom edge of the magnetic element 22 flush, or recessed, with the side wall bottom edge.

Figure 5:
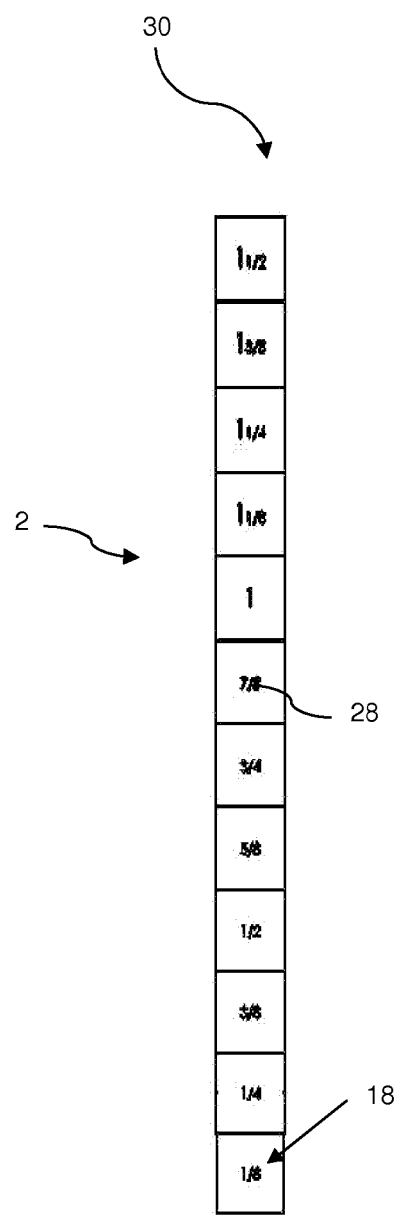
FIG. 5 illustrates a top view of one embodiment of the ruler.

FIG. 5 shows a top view of one embodiment of the ruler 30. The top 2 displays top measurement elements 28 on each of the step surfaces 18.

Figure 6:
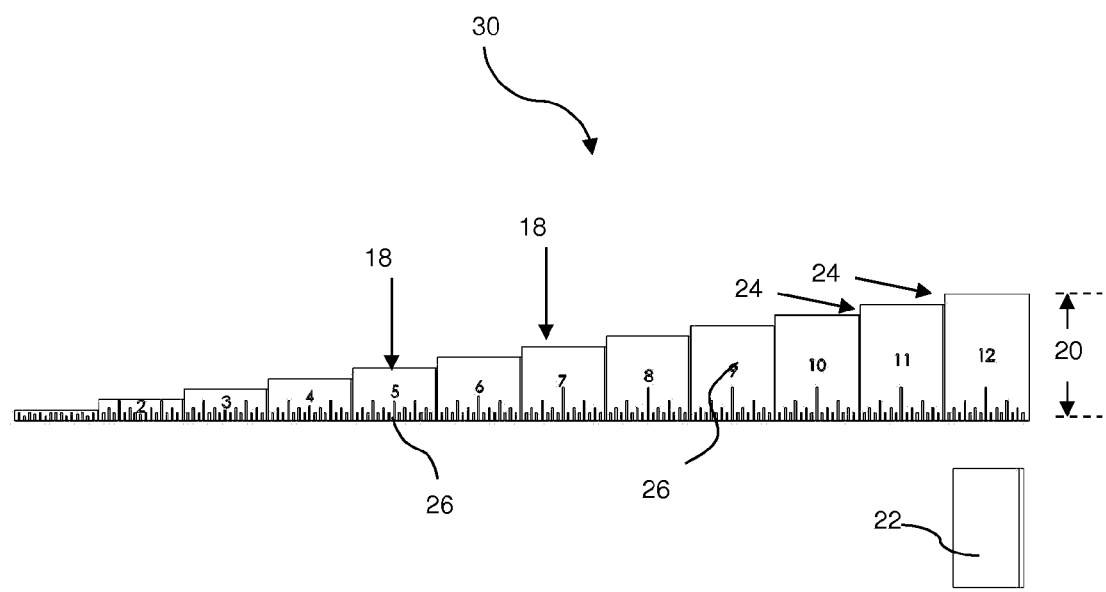
FIG. 6 illustrates an exploded right view of one embodiment of the ruler.

FIG. 6 shows an exploded right view of one embodiment of the ruler 30, and a magnetic element 22. The top has a plurality of step surfaces 18, each having a step height 20. Each step surface 18 has a height offset 24 from an adjacent step height 20 of an adjacent step surface 18, illustrated here as adjacent step height 20A and adjacent step surface 18A. The plurality of side measurement elements 26 corresponds to a distance along the ruler length from an end of the ruler 30.

Figure 7:
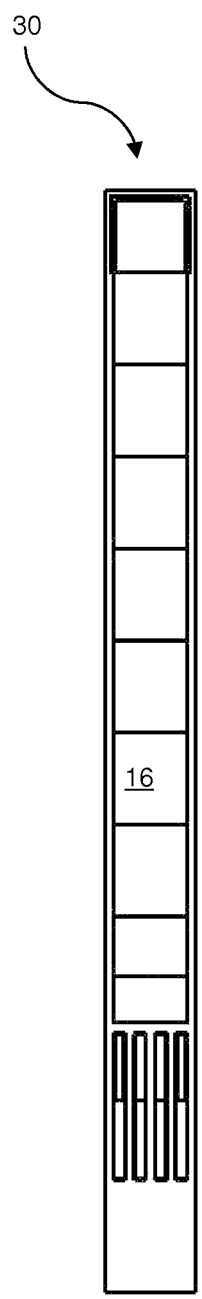
FIG. 7 illustrates a bottom view of one embodiment of the ruler.

FIG. 7 shows a bottom view of one embodiment of the ruler 30 revealing the ruler cavity 16.

Figure 8:
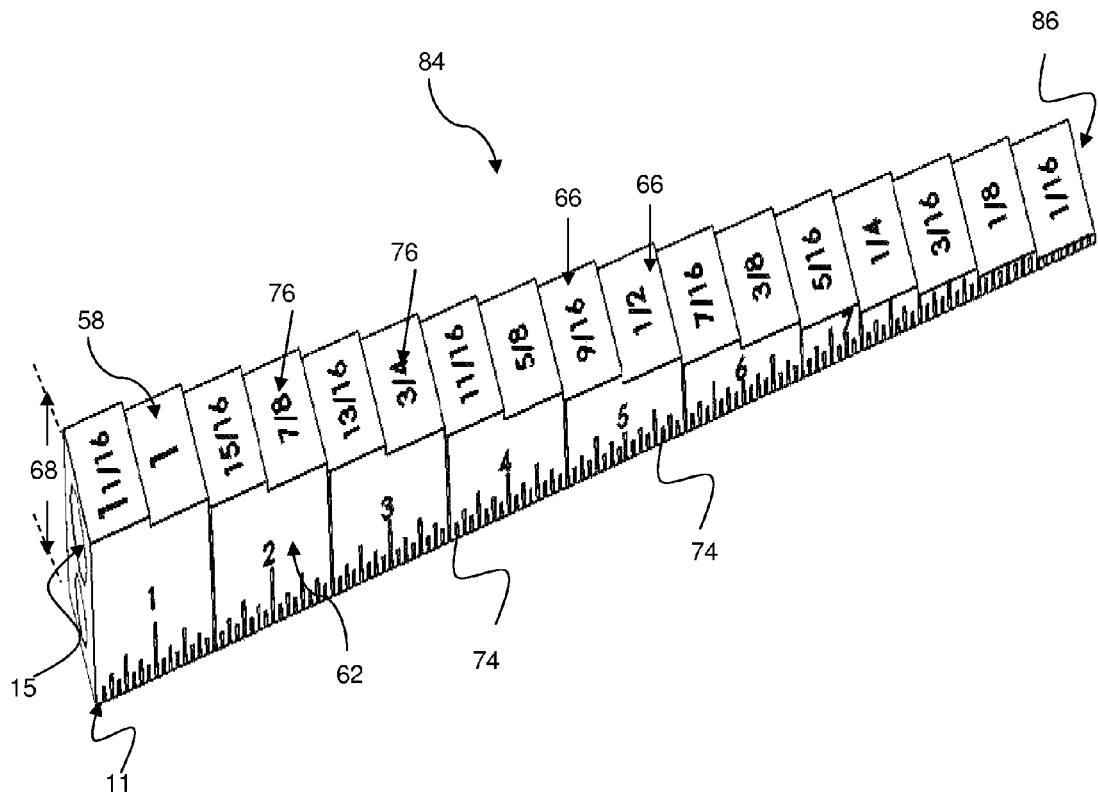
FIG. 8 illustrates a top perspective view of one embodiment of the insert ruler.

FIG. 8 shows a top perspective view of one embodiment of the insert ruler 84. The insert ruler 84 comprises an insert top extending along an insert ruler width and an insert ruler length. The insert top has an insert inner top surface, and an insert outer top surface 58. The insert ruler 84 has at least one insert side wall extending along the insert ruler length, where the side wall has an insert inner side wall surface and an insert outer side wall surface 62. The insert outer side wall surface 62 extends along the insert ruler length and generally perpendicular to the insert outer top surface 58. The insert inner top surface and the insert inner side wall surface define an insert ruler cavity (see FIG. 9). At least one insert side wall extends from an insert side wall bottom edge 11 to an insert side wall top edge 15 proximal to the insert outer top surface 58. The insert outer top surface 58 comprises a plurality of insert step surfaces 66 each having an insert step height 68 measured from the insert side wall bottom edge to the insert side wall top edge of each of the plurality of insert step surfaces 66. The insert ruler width, insert ruler length and insert ruler height may be dimensioned whereby the insert ruler nests in the ruler cavity (see FIG. 7). In an example embodiment, the insert ruler 84 comprises a insert back wall 86 extending along the insert ruler width, where the insert back wall 86 is proximal to the insert top surface and the at least one insert side wall.

Figure 9:
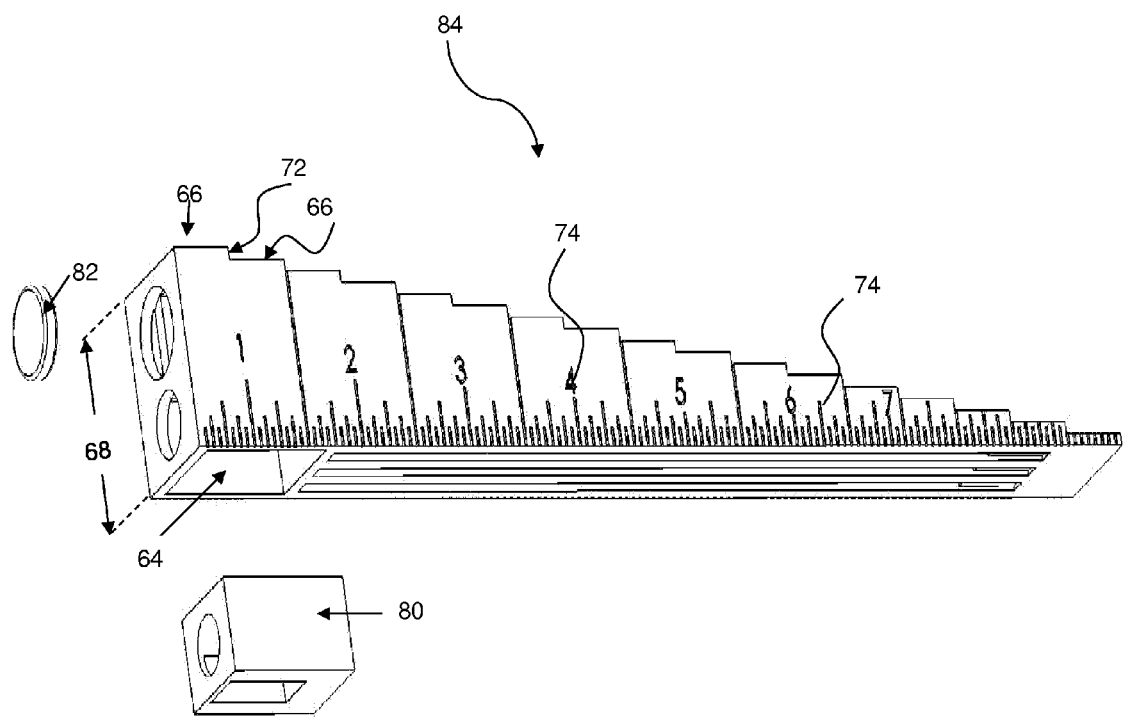
FIG. 9 illustrates an exploded perspective view of one embodiment of the insert ruler.

FIG. 9 shows an exploded perspective view of one embodiment of the insert ruler. In an example embodiment, the insert ruler 84 comprises a plurality of insert side measurement elements 74 on the insert outer side wall surface, and a plurality of insert top measurement elements 76 on the insert outer top surface (see FIG. 8). The plurality of insert top measurement elements 76 corresponds to the insert step height 68 at each of the insert step surfaces 66. The plurality of insert side measurement elements 74 corresponds to an insert distance along the insert ruler length from an insert end of the insert ruler 84. The measurement elements 76 may comprise the same type of measurement elements described above for the ruler. In one example embodiment, the insert side measurement elements 74 are printed and embossed and the insert top measurement elements 76 are debossed. The insert inner top surface and the insert inner side wall surface define an insert ruler cavity 64. In an example embodiment, the insert top and at least one side wall comprise a single unitary structure. In an example embodiment, as illustrated in FIG. 9, each of the plurality of insert step surfaces 66 has an insert step height 68. Each insert step height 68 has an insert height offset 72 from an adjacent insert step height 68 of an adjacent insert step surface 66. The length, width and height of the insert ruler may be any length and in any proportion to each other that make the insert ruler convenient for the user. This flexibility in dimension also applies to other dimensions such as the insert step heights and the insert height offsets. In one example embodiment, the length and width of the insert ruler are proportioned such that the insert ruler fits inside the larger ruler cavity. In one example embodiment, for illustration purposes and not for limitation, the insert ruler 84 has an insert ruler length of 9 inches and an insert ruler width of ¾ inch. In another example embodiment, the insert ruler length can range between 8 and 10 inches. Depending on the material in which the ruler 30 and insert ruler 84 are constructed, some embodiments of the insert ruler 84 nest in the ruler cavity of the ruler 30, with the insert side wall bottom edge (of the insert ruler 84) flush with the side wall bottom edge (of the ruler 30), or slightly recessed from the inner side wall surface or the ruler 30. The insert side measurement elements 74 are divided in any increments that are useful to the user, such as at $1/16^{th}$ of an inch increments, with larger increments, such as at each inch, labeled with numbers. In an example embodiment, the insert step height 68 can be any height, preferably less than the corresponding ruler step height 20 such that the insert ruler 84 can nest inside the ruler 30. In this example embodiment, the insert step heights 68 range from a minimum of $1/16^{th}$ of an inch to a maximum of $1 1/16^{th}$ inches, with each height offset equaling $1/16^{th}$ of an inch. The insert ruler 84 may further comprise at least one insert front wall and a writing utensil sharpener 80 removably coupled the insert front wall inside the insert ruler cavity 64. The insert ruler 84 may comprise means for coupling the writing utensil sharpener 80 to the insert ruler. In an example embodiment, the writing utensil sharpener 80 snaps into the insert ruler 84, and in another example embodiment, the writing utensil sharpener 80 is glued into the insert ruler 84. The insert front wall may also have a through hole defined so that a writing utensil may be inserted through the insert front wall in into the writing utensil sharpener 80 when it is coupled in the insert ruler 84. In embodiments, the ruler 30 and the insert ruler 84 further comprise a means to removably couple the insert ruler 84 to the ruler 30. The means to removably couple may comprise any means of removably coupling the two elements together such as magnets, mating connectors, friction connectors, hook-and-loop fasteners, press-fit connections or connectors such as screws. In an example embodiment, an insert magnetic element 82 couples the insert ruler 84 to the magnetic element 22 of the ruler 30. The insert magnetic element 82 is coupled to the insert ruler 84 by a receiving portion or recess in the insert front wall shaped to allow the insert magnetic element 82 to be flush or otherwise exposed so that it may couple to the magnetic element 22 of the ruler 30. The insert ruler may be made of materials similar to those described above for the ruler.

Figure 10:
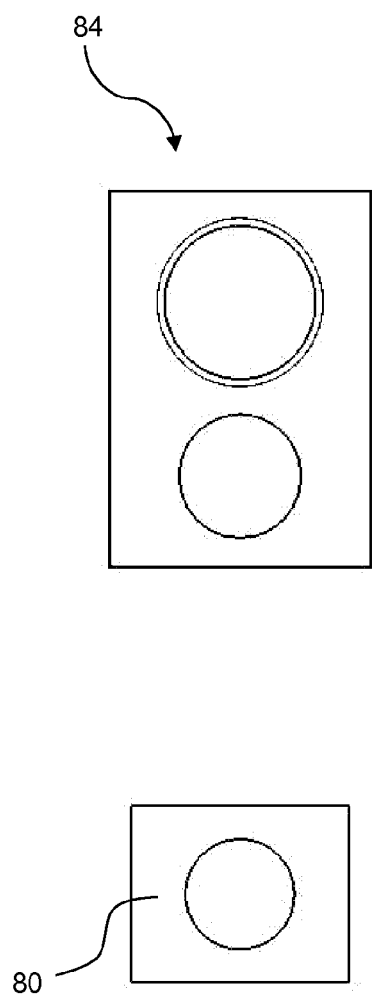
FIG. 10 illustrates an exploded front view of one embodiment of the insert ruler.

FIG. 10 shows an exploded front view of one embodiment of the insert ruler 84 and the writing utensil sharpener 80.

Figure 11:
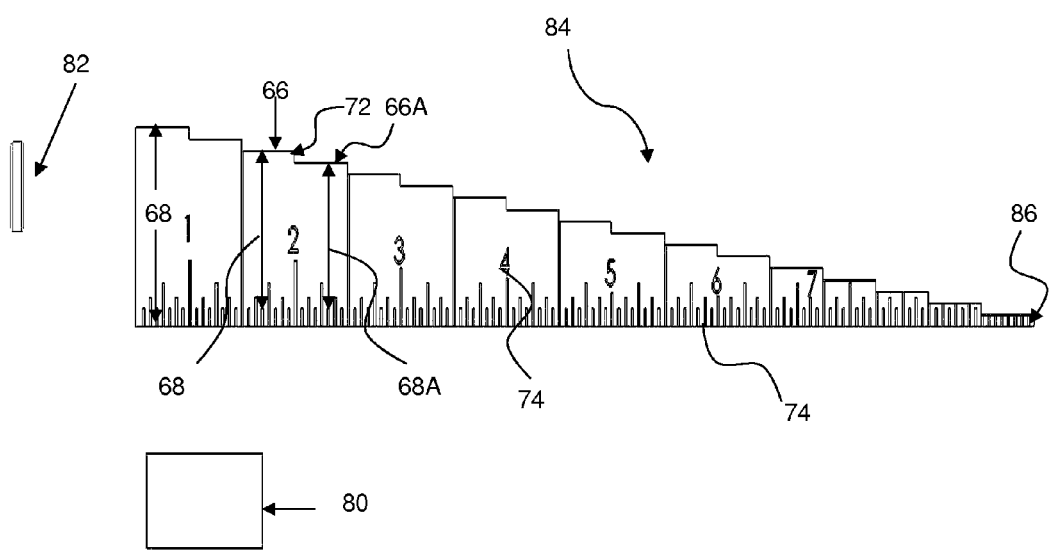
FIG. 11 illustrates an exploded left view of one embodiment of the insert ruler.

FIG. 11 shows an exploded left view of one embodiment of the insert ruler 84, and the writing utensil sharpener 80. The insert ruler 84 may have a plurality of insert side measurement elements 74 on the insert outer side wall surface. As shown, the insert side measurement elements 74 are markings along the insert outer side wall 62 and correspond to the distance of those insert side measurement elements 74 from the insert back wall 86. Each of the plurality of insert step surfaces 66 has an insert step height 68 having an insert height offset 72 from an adjacent insert step height 68 of an adjacent insert step surface 66. Illustrated here, insert step surface 66 has an insert step height 68 having an insert height offset 72 from an adjacent insert step height 68A of an adjacent insert step surface 66A. In embodiments, the insert ruler 84 may be coupled with a writing utensil sharpener 80. One example of a writing utensil sharpener may be pencil sharpener. It should be noted that any means of coupling the writing utensil sharpener 80 to the insert ruler cavity 64 of the insert ruler 84 may be used such as adhesives, mating connectors, friction, press-fit connections or connectors such as rivets or screws or any other method that secures the writing utensil sharpener 80 to the insert ruler 84. In one example embodiment, the insert magnetic element 82 attaches to the magnetic element 22 in the ruler 30.

Figure 12:
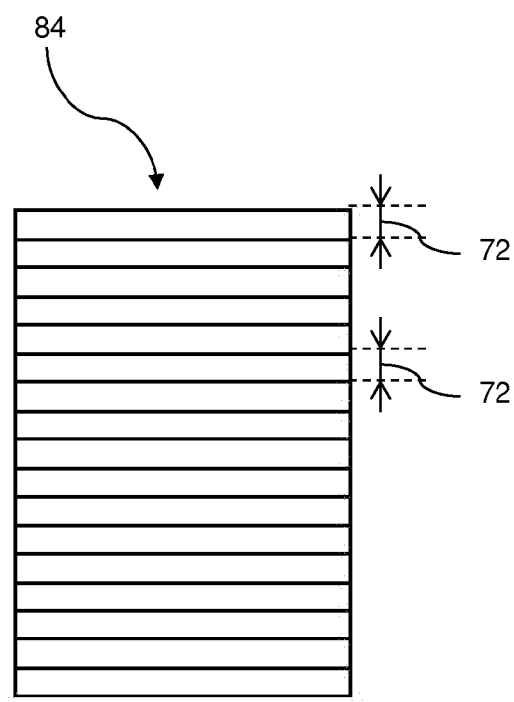
FIG. 12 illustrates an exploded front view of one embodiment of the insert ruler.
Figure 12:
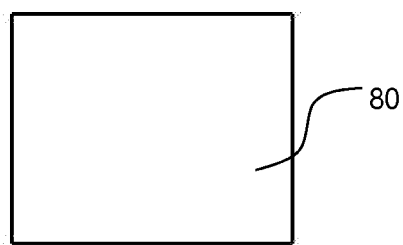

FIG. 12 shows an exploded front view of one embodiment of the insert ruler 84 and the writing utensil sharpener 80. The front view shows a plurality of insert height offsets 72 as described above in FIG. 11.

Figure 13:
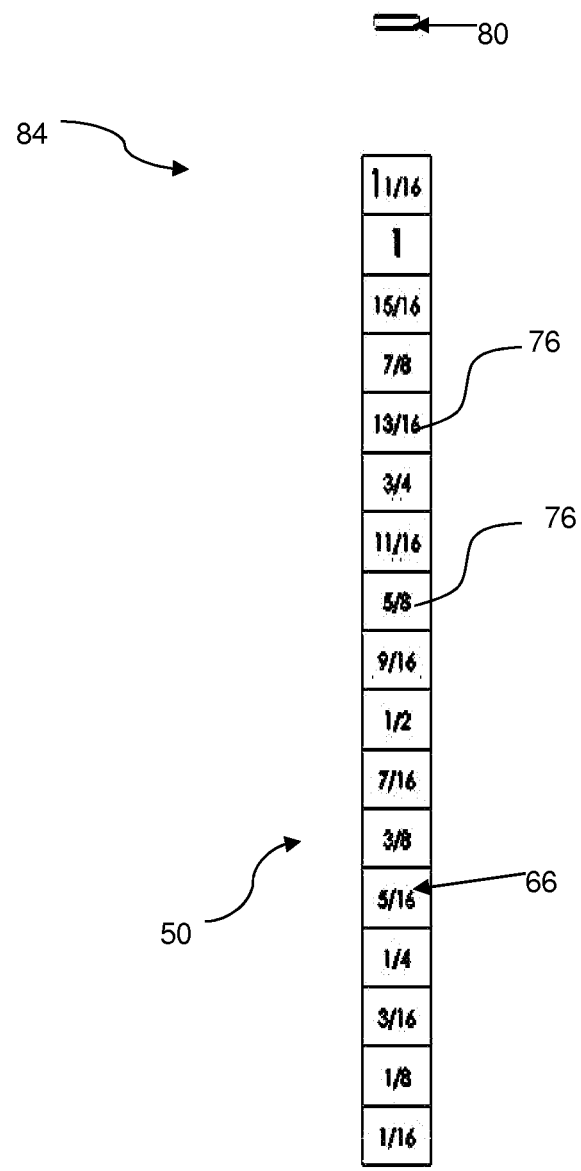
FIG. 13 illustrates an exploded top view of one embodiment of the insert ruler.

FIG. 13 shows an exploded top view of one embodiment of the insert ruler 84, and the writing utensil sharpener 80. The top 50 displays insert top measurement elements 76 on each of the insert step surfaces 66.

Figure 14:
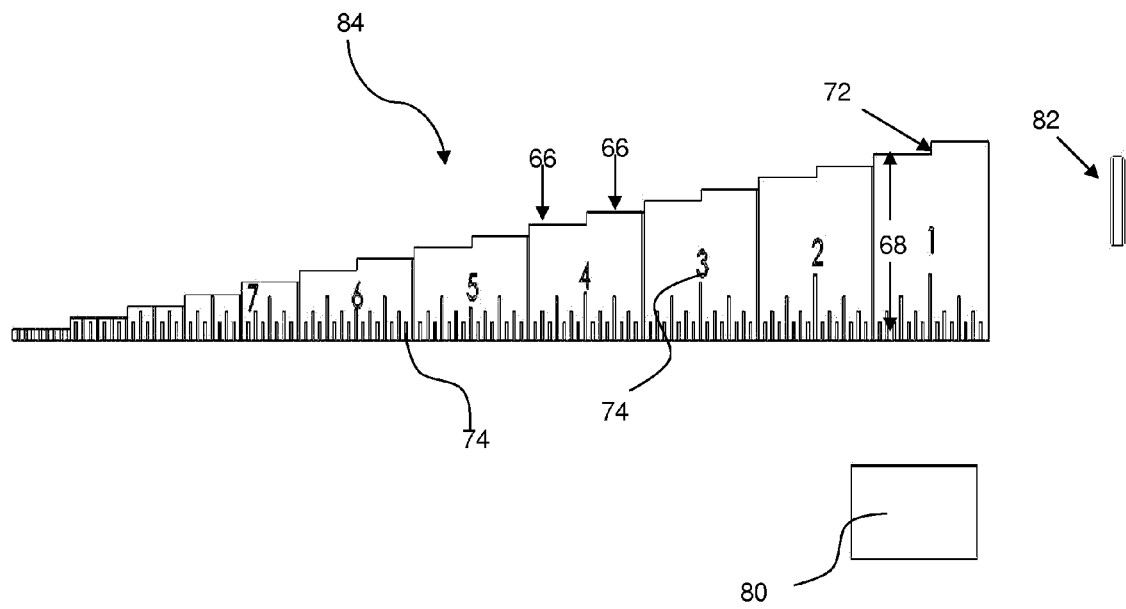
FIG. 14 illustrates an exploded left view of one embodiment of the insert ruler.

FIG. 14 shows an exploded left view of one embodiment of the insert ruler 84, and the writing utensil sharpener 80. The insert ruler 84 has a plurality of insert side measurement elements 74 on the insert outer side wall surface 62. Each of the plurality of insert step surfaces 66 has an insert step height 68. Each insert step height 68 has an insert height offset 72 from an adjacent insert step height 68 of an adjacent insert step surface 66.

Figure 15:
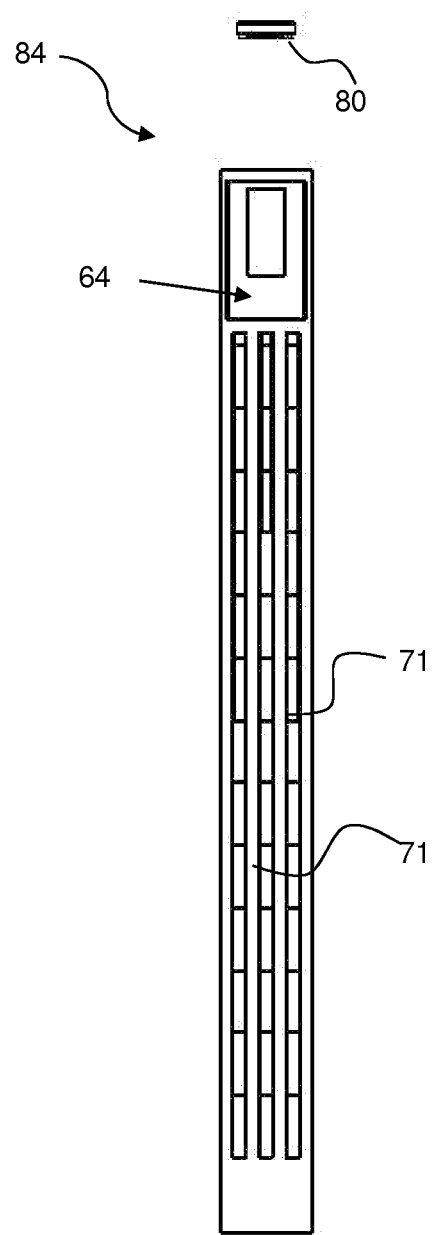
FIG. 15 illustrates an exploded bottom view of one embodiment of the insert ruler.

FIG. 15 shows an exploded bottom view of one embodiment of the insert ruler 84 displaying the insert ruler cavity 64, and the writing utensil sharpener 80. As shown, the insert ruler cavity 64 of the insert ruler 84 may have one or more stiffening elements 71 that run along the length of the insert ruler cavity and extend from the insert bottom edge to the insert inner top surface. The stiffening elements provide rigidity to the insert ruler.

Figure 16:
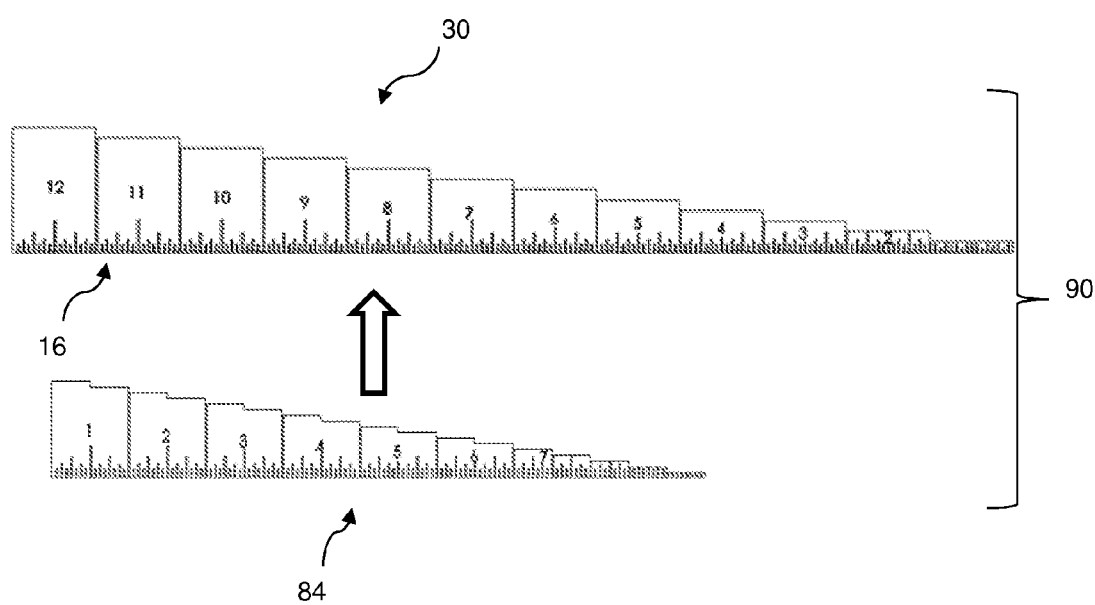
FIG. 16 illustrates a side view of the ruler assembly showing how the ruler and the insert ruler nest.

In one example embodiment, the ruler assembly 90 comprises a ruler 30 and an insert ruler 84. FIG. 16 illustrates a side view of an example embodiment of the ruler assembly 90 showing how the ruler 30 and the insert ruler 84 may nest and together where the insert outer top surface 58 nests in the ruler cavity 16. The arrow illustrates the direction this insert ruler 84 nests into the ruler cavity 16 of the ruler 30. The ruler 30 and the insert ruler 84 may be similar to embodiments described above and illustrated with FIGS. 1, 8 and 9. The insert ruler 84 comprises an insert top extending along an insert ruler width and an insert ruler length. The insert top has an insert inner top surface and an insert outer top surface 58. The insert ruler 84 has at least one insert side wall extending along the insert ruler length. The insert side wall has an insert inner side wall surface and an insert outer side wall surface 62. The insert outer side wall surface 62 extends along the insert ruler length and is generally perpendicular to the insert outer top surface 58. The insert inner top surface and the insert inner side wall surface define an insert ruler cavity 64. The insert side wall extends from an insert side wall bottom edge to an insert side wall top edge proximal to the insert outer top surface 58. The insert outer top surface 58 comprises a plurality of insert step surfaces 66 with each having an insert step height 68 measured from the insert side wall bottom edge to the insert side wall top edge of each of the plurality of insert step surfaces 66. The insert ruler width, the insert ruler length and the insert ruler height are dimensioned whereby the insert ruler 84 nests in the ruler cavity 16. In one example embodiment, the insert ruler 84 further comprises means for removably coupling the ruler 30 to the insert ruler 84. In an example embodiment, the means for removably coupling the ruler 30 to the insert ruler 84 comprise a magnetic element 22 coupled to the ruler cavity of the ruler 30, and an insert magnetic element 82 coupled to the insert ruler 84. In the example embodiment, the ruler 30 comprises a plurality of side measurement elements 26 on the outer side wall surface 14. The ruler 30 comprises a plurality of top measurement elements 28 on the outer top surface 10. The plurality of top measurement elements 28 corresponds to the step height 20 at each of the step surfaces 18. The plurality of side measurement elements 26 corresponds to a distance along the ruler length from an end of the ruler 30. The ruler 30 comprises a plurality of insert side measurement elements 74 on the insert outer side wall surface 62, and a plurality of insert top measurement elements 76 on the insert outer top surface 58. The plurality of insert top measurement elements 76 corresponds to the insert step height 68 at each of the insert step surfaces 66. The plurality of insert side measurement elements 74 corresponds to an insert distance along the insert ruler length from an insert end of the insert ruler 84. The ruler 30 also comprises means for removably coupling the ruler 30 to the insert ruler 84. In an example embodiment, the insert ruler 84 nests inside the ruler 30 inside the ruler cavity 16. Those means comprise a magnetic element 22 coupled to the cavity 16 of the ruler 30, and an insert magnetic element 82 coupled to the insert ruler 84. The ruler 30 comprises at least one insert front wall, and a writing utensil sharpener 80 removably coupled to the insert front wall inside the insert ruler cavity 64. The insert ruler 84 further comprises a means for removably attaching the writing utensil sharpener 80. Those means comprise a connector element coupled to the writing utensil sharpener 80, and a mating connector element coupled to the insert ruler 84. The top and at least one side wall of the ruler 30 comprise a single unitary structure. The ruler 30 is comprised of a nonconductive material. Each of the plurality of step surfaces 18 has a step height 20. Each step height 20 has a height offset 24 from an adjacent step height 20 of an adjacent step surface 18, where the height offset 24 is $\frac{1}{8}^{th}$ of an inch. Each of the plurality of insert step surfaces 66 has an insert step height 68. Each insert step height 68 has an insert height offset 72 from an adjacent insert step height 68 of an adjacent insert step surface 66, where the insert height offset 72 is $\frac{1}{16}^{th}$ of an inch. When the insert outer top surface 58 is placed on the outer top surface 10 of the ruler 30 the insert outer top surface 58 interlocks with the outer top surface 10. For example, at least one of the step surface 18 interlocks with at least one insert step surface 66. As described above and shown in FIG. 16, in one example embodiment, the insert ruler 84 further comprises means for removably coupling the ruler 30 to the insert ruler 84. In an example embodiment, each of the plurality of insert step surfaces 66 has an insert step height 68. Each insert step height 68 has an insert height offset 72 from an adjacent insert step height 68 of an adjacent insert step surface 66. As illustrated, the adjacent insert step height 68A and the adjacent insert step surface 66A. In an example embodiment, the insert height offset 72 is less than the height offset 24. In another example embodiment, the insert height offset 72 is one half of the height offset 24, and in yet another example embodiment, the insert height offset 72 is $\frac{1}{16}^{th}$ of an inch.

Figure 17A:
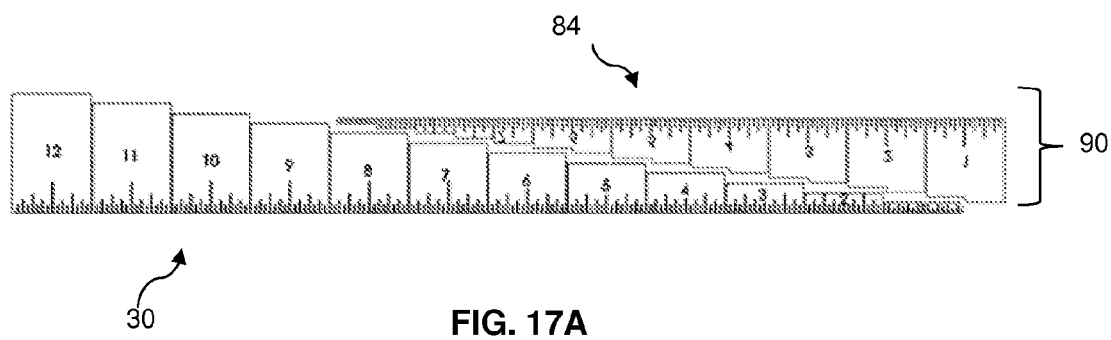
FIGS. 17A and 17B illustrate two side views of the ruler assembly showing how the ruler and the insert ruler interlock.
Figure 17B:
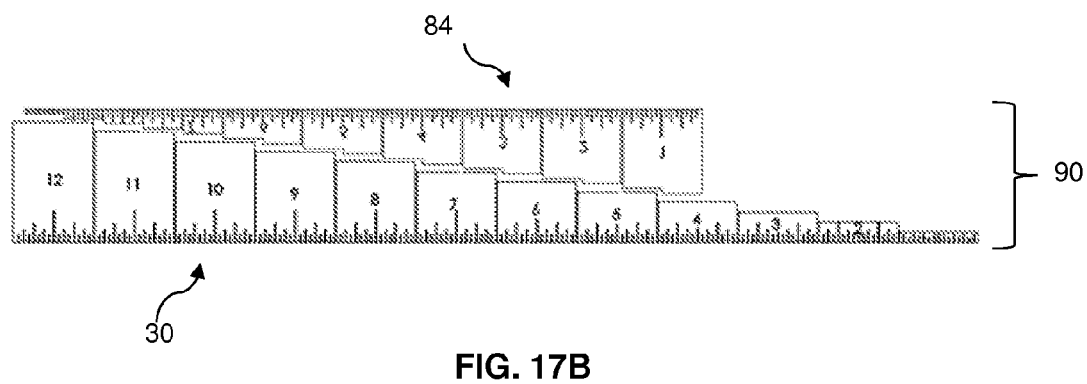

FIGS. 17A and 17B illustrate example embodiments of the ruler and the insert ruler interlocking. As shown in FIG. 17A, in one example embodiment, the insert outer top surface 58 interlocks with the outer top surface 10. For example, in this embodiment, the length of each of the plurality of insert step surface 66 is one half of a length of each of the plurality of step surfaces 18. Thus, when the insert outer top surface 58 is placed on the outer top surface 10, the insert outer top surface 58 interlocks with the outer top surface 10. In an example embodiment, at least one step surface 18 interlocks with at least one insert step surfaces 66. For example, the ruler 30 and the insert ruler 84 can each slide in opposite directions, interlocking at different respective step surface. This ruler assembly 90 can be used to measure parallel lengths. FIG. 17B similarly shows the interlocking of the ruler and the insert ruler 84 where the combined height of the two create a ruler assembly 90 with a height higher than either the ruler 30 or the insert ruler 84. The embodiment of 17B may be helpful in ensuring that two extended surfaces are parallel by a certain distance (the ruler assembly height). In embodiments, two rulers 30 may be interlocked together, or two insert rulers 84 may be interlocked together.

Example Embodiments of the Ruler Assembly in Operation:

For purposes of illustrating the operation of example embodiments of the ruler assembly, and not for limitation, example embodiments of methods of using embodiments of the ruler assembly are summarized below. As claimed and described below, the ruler assembly may comprise the ruler 30, the insert ruler 84 or the ruler 30 and insert ruler 84 together when using any of these methods. Particular embodiments of the ruler assembly are used below for illustrative purposes and not for limitation. Most of the following embodiments of methods of use refer to the elements of the example embodiment illustrated in FIG. 1 but can just as well utilize the other embodiments to include embodiments of the insert ruler.

Referring to the ruler assembly embodiment of FIG. 1, the ruler 30 can be used to determine a measurement between a first surface and a second surface in a variety of ways. In a first method, a user positions the ruler 30 between the first surface and the second surface where the outer top surface 10 is proximal to the first surface, and the side wall bottom edge is proximal to the second surface. The user aligns the side wall bottom edge with the second surface, and aligns one of the plurality of step surfaces 18 with the first surface. The user determines the measurement between the first surface and the second surface by the step height 20 that corresponds to the step surface 18 aligning with the first surface. For example, when using the ruler 30 to measure a distance between two surfaces, the user places the ruler 30 between the two surfaces, with the ruler bottom on a second surface, and makes the measurement based on the height of the step surface 18 that corresponds to the first surface. The user may move/slide the ruler 30 laterally until he/she finds the step surface 18 that corresponds to the height of the first surface. Or, the user may move the location of the first surface (for example, adjusting a height associated with the first surface) until that first surface is flush with the step surface 18 that represents the desired measurement. For example, the above methods may be used in conjunction with a table saw where the step height 20 of the ruler 30 may be used to ensure that the blade tip has been adjusted to the desired width from the saw fence.

In an example embodiment, referring to FIG. 1, the user may determine the measurement visually, in effect, eyeballing the second surface with the step surface 18. For example, the user may try to create a level, or plumb surface, whether vertical or horizontal. By holding the ruler 30 against one end of a level, as one surface, and moving that end relative to a door jamb, as another surface, the user can determine which step surface 18 results in centering the bubble in the level to create the level surface. The step height 20 associated with that step surface 18 is the distance needed to create the level surface and can be used to mark the door jamb at that measurement. In another example, in a horizontal or leveling application, the user first determines which side of area to be leveled is lower by reading the level. The user then places either the ruler 30 or the insert ruler under lower end of level and determines which step surface 18 (or insert step surface) brings the level bubble into the exact center position. The user can then determine, by noting which step surface 18 (or insert step surface) the exact size of a shim or pad to install in that location to achieve, for example, a level cabinet installation.

In another example embodiment, the user may determine the measurement tactilely, for example, running a finger across both the step surface 18 and the first surface to determine if those two surfaces are at an identical height. If the user is trying to, for example, make the first surface the same height as the step surface 18, the user may adjust the height of the second surface, and again, run a finger across both surfaces to determine if the first surface is flush with the step surface 18. A human finger can determine a thickness of 0.002 of an inch, far more precise than the human eye is capable of discerning, and thus the physical height of the step surface 18 allows a user to determine a more precise measurement. For example, the user may try to determine the height of a router bit, as one surface, from the router table or router base surface, as another surface. The bottom edge of the ruler 30 may be placed flat on the router base or router table surface, and the ruler 30 may be moved until one of the step surfaces 18 is aligned with the top edge of the router bit. Because the step surface 18 is flat along a width, it is easier to tactilely notice a difference in height as small as 0.002 of an inch by running a finger across both surfaces.

In another example embodiment, a user may measure the distance, such as a gap defined between the first surface and the second surface, by aligning one of the plurality of step surfaces 18 with the first surface, essentially aligning one of the plurality of step surfaces 18 whereby the step height 20 spans the gap. In other words, if a user is trying to measure how much of a gap exists, the user may place the side wall bottom edge 11 against the second surface, and the outer top surface 10 next to the first surface. The user may simply drop the ruler 30 between the gap to see where the ruler 30 fits snugly between the gap, and then read the top measurement element 28 that corresponds to the step surface 18 where the ruler 30 fits snugly between the two surfaces. For example, this method may be used to hang a door plumb. A level used in conjunction with the ruler 30 allows a user to accurately determine the width of shims needed at the location of the hinges. The user positions the ruler 30 between a door jamb and a level, and determines which step height 20 results in a vertical level. The height distance associated with that step height 20 is the width of the shim needed at that hinge location.

In another example embodiment, the user may measure the distance between a first surface and a second surface by positioning the ruler 30 between a first point on the first surface and a second point on the second surface, where the back wall 32 is proximal to the second point. One of the offset height walls is positioned proximal to the first point where one of the offset height walls engages the first surface proximal to the first point. In other words, the ruler 30 is flipped upside down, and laid on the second surface such that one of the height offsets 24 acts as a lip that catches on, for example, the edge of a board to stabilize the ruler 30. A user determines a measurement between the first point and the second point as a length distance between the offset height wall and the back wall 32. In other words, the distance is based on the length from the end of the ruler 30 to the location where the height offset 24 is acting as a lip to stabilize the ruler 30. In an example embodiment, the user determines the distance using the plurality of side measurement elements 26 on the ruler 30. For example, if the user uses the height offset 24 associated with the step surface 18 measuring ¾", then the side measurement elements 26 at the position on the ruler 30 are 5 inches. In an example embodiment of this method when marking a board with a top surface and an edge, as a second surface, the user may place a scribing end of a writing utensil, such as the tip of a pencil, proximal to the back wall 32 and against the top surface, such that the pencil can mark the top surface. By moving the ruler 30 and the pencil in unison with the ruler width held in parallel to the edge, the user can record the measurement (i.e., draw a line with a pencil) from the edge. In another example embodiment, the user may score, or cut material (fabric, vinyl, etc.), for example, using a box cutter, or a rotary cutter, and the ruler 30.

In another example embodiment, a user may determine a measurement between a first surface and a second surface using the ruler 30. The user positions the ruler 30 between a first point on the first surface and a second point on the second surface where the outer top surface 10 is proximal to the first point. The user may stabilize the side wall bottom edge flush with the second point. For example, the user may use his/her hand or finger to stabilize the ruler 30 flush with the second point. The second surface may be the side of a board and the second point may be, for example, the edge of the board where the side and the top meet. In this scenario, the ruler 30 is flipped on its side such that the outer side wall is laying on top of the board as a first surface and the first point is a point on the top of the board. The user then aligns the outer top surface 10 with the first point, and determines the distance between the first point and the second point as the step height 20 corresponding to the step surface 18 aligning with the first point. The user identifies the distance by a top measurement element 28 that corresponds to the step height 20 when the side wall bottom edge, at a point perpendicular to the step height 20, is flush with the first point. In other words, the distance between the first point and the second point is the height associated with the step surface 18 that spans the two points. In an example embodiment, the user places a scribing end of a writing utensil, such as the tip of a pencil proximal to the step surface 18 aligning with the first point. The user may also move the ruler 30 and the pencil in unison to record the measurement with a marking. The ruler length is held parallel to the edge of the board by the stabilization of the side wall bottom edge at the first point. In another example embodiment, the user may score, or cut material (fabric, vinyl, etc.), for example, using a box cutter, or a rotary cutter, and the ruler 30.

In another example embodiment, the user may interlock the ruler 30 and the insert ruler 84 to create the ruler assembly 90 as illustrated in FIG. 17A. When the insert outer top surface 58 is placed against the outer top surface 10, the insert outer top surface 58 interlocks with the outer top surface 10. As shown, the resulting overall length of the ruler assembly 90 may be longer than the length of either the ruler 30, or the insert ruler 84. FIG. 17B shows the interlocking of the ruler 30 and the insert ruler 84 where the combined height of the two create a ruler assembly 90 with a height higher than either the ruler 30 or the insert ruler 84. This embodiment of the ruler assembly 90 may be used to determine whether two planes are in parallel with each other. For example, the parallel measure may be used to ensure that a table saw blade is in parallel with the fence. It should be noted that two rulers 30 may be interlocked in this fashion, and/or two insert rulers 84 may also be interlocked in this fashion.

Therefore, the foregoing is considered as illustrative only of the principles of embodiments disclosed herein. Further, since numerous modifications and changes will readily occur to those skilled in the art, it is not desired to limit embodiments disclosed herein to the exact construction and operation shown and described, and accordingly, all suitable modifications and equivalents may be resorted to, falling within the scope of embodiments disclosed herein. Although embodiments disclosed herein has been described in the above forms with a certain degree of particularity, it is understood that the present disclosure has been made only by way of example and numerous changes in the details of construction and combination and arrangement of parts may be resorted to without departing from the spirit and scope of embodiments disclosed herein.

I claim:

1. A ruler assembly, said assembly comprising:
    a ruler having a top extending along a ruler width and a ruler length;
    the top having an inner top surface and an outer top surface;
    at least one side wall extending along the ruler length;
    the at least one side wall having an inner side wall surface and an outer side wall surface;
    the outer side wall surface extending along the ruler length and generally perpendicular to the outer top surface;
    the inner top surface and the inner side wall surface defining a ruler cavity;
    the at least one side wall extending from a side wall bottom edge to a side wall top edge proximal to the outer top surface;
    the outer top surface comprising a plurality of step surfaces each having a step height measured from the side wall bottom edge to the side wall top edge of each of the plurality of step surfaces; and
    further comprising an insert ruler comprising:
        an insert top extending along an insert ruler width and an insert ruler length,
        the insert top having an insert inner top surface and an insert outer top surface,
        at least one insert side wall extending along the insert ruler length,
        the at least one insert side wall having an insert inner side wall surface and an insert outer side wall surface,
        the insert outer side wall surface extending along the insert ruler length and generally perpendicular to the insert outer top surface,
        the insert inner top surface and the insert inner side wall surface defining an insert ruler cavity,
        the at least one insert side wall extending from an insert side wall bottom edge to an insert side wall top edge proximal to the insert outer top surface,
        the insert outer top surface comprising a plurality of insert step surfaces each having an insert step height measured from the insert side wall bottom edge to the insert side wall top edge of each of the plurality of insert step surfaces, and
        the insert ruler width, the insert ruler length and the insert ruler height dimensioned whereby the insert ruler removably nests completely within the ruler cavity.

2. The ruler assembly of claim 1 further comprising:
    a plurality of side measurement elements on the outer side wall surface;
    a plurality of top measurement elements on the outer top surface;
    the plurality of top measurement elements corresponding to the step height at each of the plurality of step surfaces; and
    the plurality of side measurement elements corresponding to a distance along the ruler length from an end of the ruler assembly.

3. The ruler assembly of claim 1 wherein the ruler assembly is comprised of a nonconductive material.

4. The ruler assembly of claim 1 wherein each of the plurality of step surfaces has a step height having a height offset from an adjacent step height of an adjacent step surface and the height offset is $1/8^{th}$ of an inch.

5. The ruler assembly of claim 1 further comprising means for removably coupling the insert ruler assembly to the cavity of the ruler assembly.

6. The ruler assembly of claim 5 wherein means for removably coupling the insert ruler assembly to the cavity of the ruler assembly comprises:
    a magnetic element coupled to the cavity of the ruler assembly; and
    an insert magnetic element coupled to the insert ruler.

7. The ruler assembly of claim 1 wherein:
  each of the plurality of step surfaces has a step height having a height offset from an adjacent step height of an adjacent step surface; and
  each of the plurality of insert step surfaces has an insert step height having an insert height offset from an adjacent insert step height of an adjacent insert step surface.

8. The ruler assembly of claim 7 wherein the insert height offset is less than the height offset.

9. The ruler assembly of claim 7 wherein the insert height offset is one half of the height offset.

10. The ruler assembly of claim 7 wherein the insert height offset is $1/16^{th}$ of an inch.

11. The ruler assembly of claim 9 wherein:
  a length of each of the plurality of insert step surface is one half of a length of each of the plurality of step surfaces whereby when the insert outer top surface is placed on the outer top surface of the ruler, the insert outer top surface interlocks with the outer top surface.

12. The ruler assembly of claim 11 wherein when the insert outer top surface is placed on the outer top surface of the ruler:
  at least one step surface interlocks with at least one insert step surface;
  a portion of one step surface is flush with a portion of one insert step surface; and
  the side wall bottom edge of the ruler assembly and the insert side wall bottom edge of the insert ruler assembly are parallel.

13. The ruler assembly of claim 1 further comprising:
  a plurality of side measurement elements on the outer side wall surface;
  a plurality of top measurement elements on the outer top surface;
  the plurality of top measurement elements corresponding to the step height at each of the step surfaces;
  the plurality of side measurement elements corresponding to a distance along the ruler length from an end of the ruler assembly;
  a plurality of insert side measurement elements on the insert outer side wall surface;
  a plurality of insert top measurement elements on the insert outer top surface;
  the plurality of insert top measurement elements corresponding to the insert step height at each of the insert step surfaces;
  the plurality of insert side measurement elements corresponding to an insert distance along the insert ruler length from an insert end of the insert ruler assembly;
  a means for removably coupling the insert ruler assembly to the cavity of the ruler assembly comprising a magnetic element coupled to the cavity of the ruler assembly and an insert magnetic element coupled to the insert ruler;
  at least one insert front wall;
  a writing utensil sharpener removably coupled to the at least one insert front wall inside the insert ruler cavity;
  means for removably attaching the writing utensil sharpener comprising a connector element coupled to the writing utensil sharpener and a mating connector element coupled to the insert ruler;
  wherein the top and the at least one side wall comprises a single unitary structure;
  wherein the ruler assembly is comprised of a nonconductive material;
  wherein each of the plurality of step surfaces has a step height having a height offset from an adjacent step height of an adjacent step surface;
  wherein the height offset is $1/8^{th}$ of an inch;
  wherein each of the plurality of insert step surfaces has an insert step height having an insert height offset from an adjacent insert step height of an adjacent insert step surface;
  wherein the insert height offset is $1/16^{th}$ of an inch; and
  whereby when the insert outer top surface is placed on the outer top surface of the ruler:
    the insert outer top surface interlocks with the outer top surface,
    at least one step surface interlocks with at least one insert step surface,
    a portion of one step surface is flush with a portion of one insert step surface, and the side wall bottom edge of the ruler assembly and the insert side wall bottom edge of the insert ruler assembly are parallel.

14. A ruler assembly, said assembly comprising:
  an insert ruler having an insert top extending along an insert ruler width and an insert ruler length;
  the insert top having an insert inner top surface and an insert outer top surface;
  at least one insert side wall extending along the insert ruler length;
  the at least one insert side wall having an insert inner side wall surface and an insert outer side wall surface;
  the insert outer side wall surface extending along the insert ruler length and generally perpendicular to the insert outer top surface;
  the insert inner top surface and the insert inner side wall surface defining an insert ruler cavity;
  the at least one insert side wall extending from an insert side wall bottom edge to an insert side wall top edge proximal to the insert outer top surface;
  the insert outer top surface comprising a plurality of insert step surfaces each having an insert step height measured from the insert side wall bottom edge to the insert side wall top edge of each of the plurality of insert step surfaces;
  the insert ruler assembly is comprised of a nonconductive material;
  a ruler having a top extending along a ruler width and a ruler length;
  the top having an inner top surface and an outer top surface;
  at least one side wall extending along the ruler length;
  the at least one side wall having an inner side wall surface and an outer side wall surface;
  the outer side wall surface extending along the ruler length and generally perpendicular to the outer top surface;
  the inner top surface and the inner side wall surface defining a ruler cavity;
  the at least one side wall extending from a side wall bottom edge to a side wall top edge proximal to the outer top surface;
  the outer top surface comprising a plurality of step surfaces each having a step height measured from the side wall bottom edge to the side wall top edge of each of the plurality of step surfaces;
  a u-shaped magnetic element positioned in the ruler assembly cavity; and
  a round magnet positioned on a front wall of the insert ruler assembly whereby the round magnet and the u-shaped magnetic element are capable of removably coupling the insert ruler assembly to the cavity of the ruler assembly.

15. The ruler assembly of claim 14 wherein the insert ruler removably nests completely in the ruler cavity.

16. The ruler assembly of Claim 14 further comprising:
  at least one insert front wall; and
  a writing utensil sharpener removably coupled to the at least one insert front wall inside the insert ruler cavity.

17. A method of determining a measurement between a first surface and a second surface using a ruler assembly, the method comprising:
  providing a ruler assembly comprising a ruler comprising:
    a top having an inner top surface and an outer top surface,
    at least one side wall extending along a ruler length,
    the at least one side wall having an inner side wall surface and an outer side wall surface,
    the at least one side wall extending from a side wall bottom edge to a side wall top edge proximal to the outer top surface,
    the outer top surface comprising a plurality of step surfaces each having a step height measured from the side wall bottom edge to the side wall top edge of each of the plurality of step surfaces;
  the ruler assembly further comprising an insert ruler comprising:
    an insert top extending along an insert ruler width and an insert ruler length;
    the insert top having an insert inner top surface and an insert outer top surface;
    at least one insert side wall extending along the insert ruler length;
    the at least one insert side wall having an insert inner side wall surface and an insert outer side wall surface;
    the insert outer side wall surface extending along the insert ruler length and generally perpendicular to the insert outer top surface;
    the insert inner top surface and the insert inner side wall surface defining an insert ruler cavity;
    the at least one insert side wall extending from an insert side wall bottom edge to an insert side wall top edge proximal to the insert outer top surface;
    the insert outer top surface comprising a plurality of insert step surfaces each having an insert step height measured from the insert side wall bottom edge to the insert side wall top edge of each of the plurality of insert step surfaces; and
    the insert ruler width, the insert ruler length and the insert ruler height dimensioned whereby the insert ruler removably nests completely within the ruler cavity;
  positioning the ruler assembly between the first surface and the second surface whereby the insert wall bottom edge is adjacent to the first surface and the side wall bottom edge is proximal to the second surface;
  aligning the side wall bottom edge with the second surface;
  aligning the insert wall bottom edge with the first surface; and
  determining the measurement between the first surface and the second surface as the step height corresponding to the step height and the insert step height aligning with the first surface.

18. The ruler assembly of claim 6 wherein:
  the magnetic element comprises a u-shaped magnetic element positioned in the ruler assembly cavity; and
  the insert magnetic element comprises a round magnet positioned on a front wall of the insert ruler assembly.

\* \* \* \* \*